United States Patent
Romera Carrion

(10) Patent No.: US 9,055,819 B2
(45) Date of Patent: Jun. 16, 2015

(54) PIANO SEAT WITH AUTOMATIC HEIGHT ADJUSTMENT

(75) Inventor: Antonio Raul Romera Carrion, Valencia (ES)

(73) Assignee: HIDRAU MODEL, S.L., Valencia (ES)

( * ) Notice: Subject to any disclaimer, the term of this patent is extended or adjusted under 35 U.S.C. 154(b) by 0 days.

(21) Appl. No.: 14/119,525

(22) PCT Filed: Jun. 6, 2012

(86) PCT No.: PCT/ES2012/070419
§ 371 (c)(1),
(2), (4) Date: Nov. 22, 2013

(87) PCT Pub. No.: WO2012/168526
PCT Pub. Date: Dec. 13, 2012

(65) Prior Publication Data
US 2014/0091191 A1   Apr. 3, 2014

(30) Foreign Application Priority Data
Jun. 6, 2011   (ES) .................................. 201130935

(51) Int. Cl.
*F16M 13/00* (2006.01)
*A47C 3/20* (2006.01)
*A47C 9/08* (2006.01)
*B60N 2/16* (2006.01)

(52) U.S. Cl.
CPC . *A47C 3/20* (2013.01); *B60N 2/162* (2013.01); *A47C 9/08* (2013.01)

(58) Field of Classification Search
CPC .............. A47C 3/20; A47C 3/30; A47C 9/08; B60N 2/1615; B60N 2/162; B60N 2/1675; B60N 2/502; B60N 2/505; B60N 2/525; B60N 2/52

USPC ................. 248/421, 157, 588; 297/338, 339, 297/344.17, 344.16, 344.15
See application file for complete search history.

(56) References Cited

U.S. PATENT DOCUMENTS

| | | | |
|---|---|---|---|
| 4,108,416 A | | 8/1978 | Nagase et al. |
| 4,232,901 A | * | 11/1980 | Harrington et al. ...... 297/423.45 |
| 4,511,110 A | * | 4/1985 | Moller .......................... 248/421 |
| 4,926,760 A | * | 5/1990 | Sack ............................. 108/145 |

(Continued)

FOREIGN PATENT DOCUMENTS

| | | | |
|---|---|---|---|
| DE | 19925340 A1 * | 12/2000 | ............. A47C 19/04 |
| FR | 2693641 | 1/1994 | |

(Continued)

*Primary Examiner* — Anita M King
(74) *Attorney, Agent, or Firm* — Sturm & Fix LLP

(57) ABSTRACT

Piano seat that has a structure for raising and lowering that is formed by two pairs of "L" section profiles arranged in a facing manner, two at the bottom and two at the top, which are connected together by individual pairs of scissor-type mechanisms, or assemblies in the form of an "X", which are articulated and arranged in a facing manner, and also by a series of transverse bars, there being, at the end of the scissor-type mechanism, articulations connecting to the upper and lower profiles, which are stationary and movable, these latter running via oblong slots in the upper and lower "L" profiles; the entire assembly is moved by gas springs actuated by actuators, which results in a seat that is noiseless when adjusted and used, which requires no effort on the part of the user, is easy and convenient to use and also to assemble, and which has no rebound effect and is rigid and robust.

4 Claims, 3 Drawing Sheets

(56) References Cited

U.S. PATENT DOCUMENTS 5,285,992 A * 2/1994 Brown ............... 248/421
6,550,740 B1 * 4/2003 Burer ............... 248/564
8,733,508 B2 * 5/2014 Bacon ............... 187/269

FOREIGN PATENT DOCUMENTS

| FR | 2693641 A1 * | 1/1994 | ............... A47C 3/20 |
| JP | 2002345591 | 3/2002 | |
| JP | 2004033291 | 2/2004 | |

* cited by examiner

PIANO SEAT WITH AUTOMATIC HEIGHT ADJUSTMENT

OBJECT OF THE INVENTION

The invention herein, as the title of the invention indicates, relates to a piano seat that could be used in concerts or on other stages, which has the particular feature of being able to adjust the height of the seat automatically.

The special configuration and design of the means for adjusting the seat height characterise the invention herein, such that its height can be adjusted in a fast, simple and easy manner, without any particular effort, eliminating noises during use, all using simple components and wherein the rebound effect of the mechanism is virtually nil.

Therefore, the invention herein is confined within the scope of seats and stools, and particularly those which use a means for adjusting the height of the seat which are automatic.

BACKGROUND OF THE INVENTION

Current seat models do not allow for automatic height adjustment, such adjustment being made by means of a lead-screw-type mechanical system and is actuated manually by the user. This means the user has to use considerable force to adjust the height of the seat.

In general, the aforementioned known systems for adjusting height present different challenges. For example, they are systems that make audible noises, and these noises are particularly significant for pianists as they are audible from the pianist's normal playing position when the latter is playing the piano in concert and slides from one side of the seat to the other.

In addition, such systems are not easy and convenient to use, requiring some effort on the part of the user. Another added difficulty is that the systems used are not easy to assemble and disassemble if any repair is required. These systems have a rebound effect, and the components used are complex, therefore requiring considerable time for adjustment.

It is therefore an object of the invention herein to develop a piano seat that is height adjustable automatically and further providing a quick adjustment for the user, with little effort, no noticeable noise, minimal rebound and ensuring the seat is completely stable, rigid and convenient when used.

DESCRIPTION OF THE INVENTION

The object of the invention herein is a piano seat with automatic height adjustment that aims to improve technical aspects that can be improved and which existing seats on the market have hitherto failed to resolve.

Therefore, this seat aims to improve and solve the following technical aspects:
  Noise: The mechanism makes no audible noise from the pianist's normal playing position when the latter is playing the piano in concert and slides from one side of the seat to the other.
  Ease and convenience of use: The new system ensures actuation by means of applying minimal effort on the part of the user, such that it is convenient to use. The user can adjust the height of the seat by a slight rotation of the actuator.
  Ease of assembly and disassembly of the system for possible repairs.
  Simple components that make the assembly simple to use.
  Rebound: the rebound effect of the mechanism is virtually nil.

To do this, the seat, object of the invention, has pairs of "L"-section profiles arranged in a facing manner, two at the bottom and two at the top, which are connected together by individual pairs of scissor-type mechanisms, or assemblies in the form of an "X" which are articulated, as well as a series of intermediate transverse bars which connect the upper and lower "L"-profiles.

The upper part of the structure for raising and lowering can be raised and drawn closer to the lower profiles as there are two pairs of oblong slots on the two pairs of facing profiles through which movable articulations slide, which at the same time enable the rotation of the pairs of scissor-type mechanisms and the longitudinal movement of said articulations, resulting in a raising and lowering movement of the upper part relative to the bottom.

The action of raising and lowering is achieved by individual pairs of gas springs, that act on each of the pairs of scissor-type mechanisms, once the gas spring triggers have been released by means of an actuator that emerges from each of the sides of the seat.

The actuators for releasing the gas spring triggers protrude from the sides of the seat, such that by rotating either of the two actuators, the central rotation part which is connected to a number of cables rotates, secured at one end to this central rotation part and the other end is attached to an angular part which by way of a trigger actuates the gas springs.

This aspect of operation is important as the actuation cable, of the angular part which by way of a trigger actuates the gas springs, is not wound, preventing it from getting cut and deteriorating.

When the cable is tensioned, it acts on each "trigger" which exerts pressure on the gas spring valves causing them to extend and consequently to move the seat height.

For lowering the seat height, when the user rotates the actuator and the sequence described above occurs, and when the user is seated, the gas spring is released by pressing the trigger of the gas spring valve, and the weight of the user's body causes the seat to lower.

By using the structure described, the following advantages are achieved:
  Simplification of the parts, cost savings for the company when manufacturing.
  Easy to assemble, lower labour costs, as the system installation time is reduced.
  Cost-optimisation of parts thanks to the cooperation of AIMME which provides the necessary technologies for weight, material type, etc. . . .
  Rigid and robust for the seat to bear a weight exceeding 150 kg.
  To actuate the mechanism downwards, a minimum force equal to or greater than 30 kg has to be made. This prevents children from playing with the seat, thereby avoiding potential accident risks.
  Speed of adjustment, which is achieved by the rotation of the actuator, while the greater the degree of rotation, the faster the seat height is adjusted.
  A maximum height adjustment of 120 mm is achieved.
  Noise reduction during use and when maneuvering to adjust.
  Requires no effort on the part of the user, by eliminating the manual action.

DESCRIPTION OF THE DRAWINGS

As a complement of the description being made hereinbelow and for a better understanding of the characteristics of the invention, according to an example of a practical preferred embodiment thereof, attached as an integral part of the aforementioned description is a set of drawings where, for purposes of illustration and in a non-limiting manner, the following is shown.

PREFERRED EMBODIMENT OF THE INVENTION

In view of the figures, a preferred embodiment of the proposed invention is described below.

Figure 1:
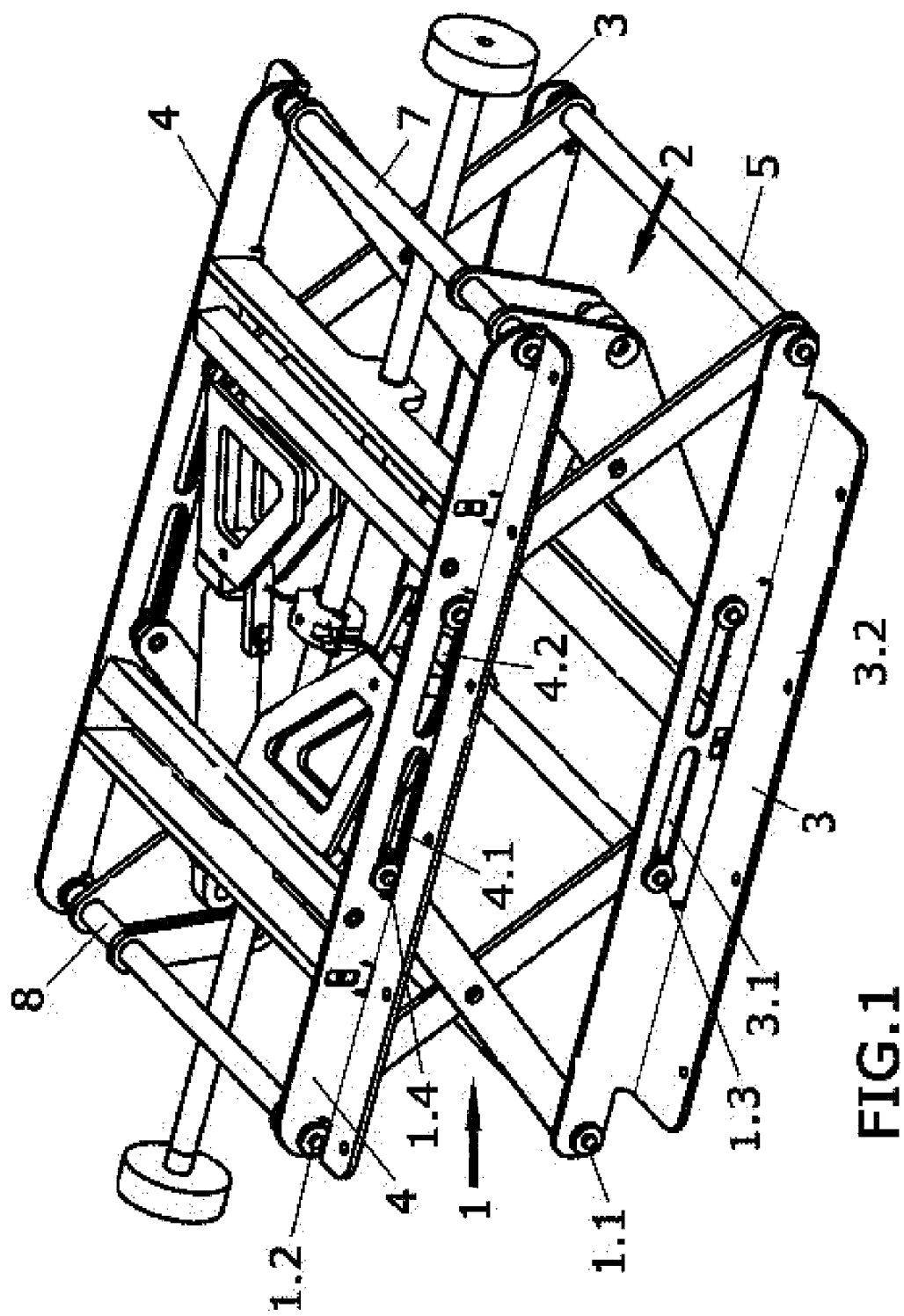
FIG. 1 shows a perspective view of the structure for raising and lowering a seat, where the structure is partially unfolded.

As seen in FIG. 1, the seat with automatic height adjustment is a structure formed by:

A first pair of scissor-type mechanisms (1) or articulated structure in the form of an "X" (1) arranged in a facing manner, there being, at its ends, a lower stationary point of articulation (1.1), and a lower movable point of articulation (1.3) at the bottom, whereas the upper ends have an upper stationary point of articulation (1.2) and an upper movable point of articulation (1.4).

a second pair of scissor-type mechanisms (2) or articulated structure in the form of an "X" (2), arranged in a facing manner, there being, at its ends, a first lower stationary point of articulation (2.1), and a first lower movable point of articulation (2.3) at the bottom, whereas the upper ends have a second upper stationary point of articulation (2.2) and a second upper movable point of articulation (2.4), where the lower articulations occur in two "L"-section angular profiles (3) arranged in a facing manner, while the upper articulations occur in two upper "L"-section angular profiles (4) arranged in a facing manner, the facing articulations, both at the bottom and at the top, stationary and mobile being joined together by connecting bars, wherein above each of the profiles there are individual oblong slots (3.1), (3.2) made in lower "L"-profiles, (3), whereas with oblong slots (4.1) and (4.2) made in the upper "L" profiles (4), wherein the upper "L" profiles (4) are further connected together by intermediate transverse bars (9), (10), (24) and (25) and wherein the assembly is moved by raising or lowering a first gas spring (11) and a second gas spring (13), which are actuated by two actuators (15) and (16).

Figure 2:
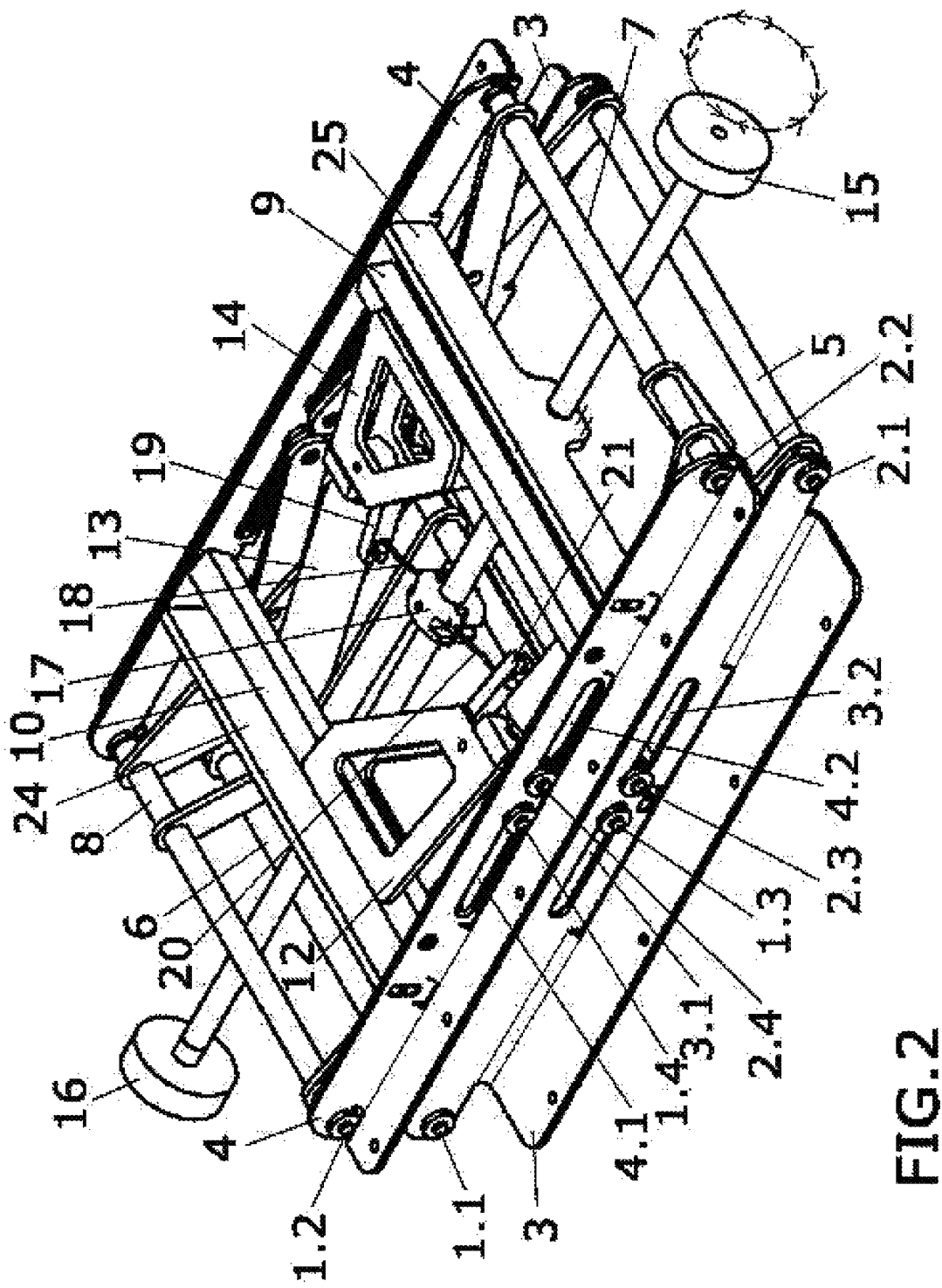
FIG. 2 shows the view of the structure for raising and lowering a seat, where the structure is completely folded.

FIGS. 1 and 2 show how individual pairs of scissor-type mechanisms or articulated structures in the form of an "X" (1) and (2) have facing articulations and which connect with the "L"-profiles, joined by individual transverse bars. Therefore, the bar (5) connects the lower facing stationary articulations (2.1) of the scissor-type mechanism (2), while the bar (7) connects the upper facing stationary articulations (2.2) of the same scissor-type mechanism. On the other hand, the bar (6) connects the lower facing stationary articulations (1.1) of the pair of facing scissor-type mechanisms (1), while the bar (8) connects the upper facing stationary articulations (1.2) of the pair of facing scissor-type mechanisms (1).

In order to avoid noise in the lower oblong slots (3.1) and (3.2) and in the upper slots (4.1) and (4.2) through which the movable articulations (1.3), (2.3) and (1.4) and (2.4) run respectively, plastic material or the like is used, which does not produce any noise, said movable articulations being preferably housed in rollers made of plastic material or the like.

Figure 3:
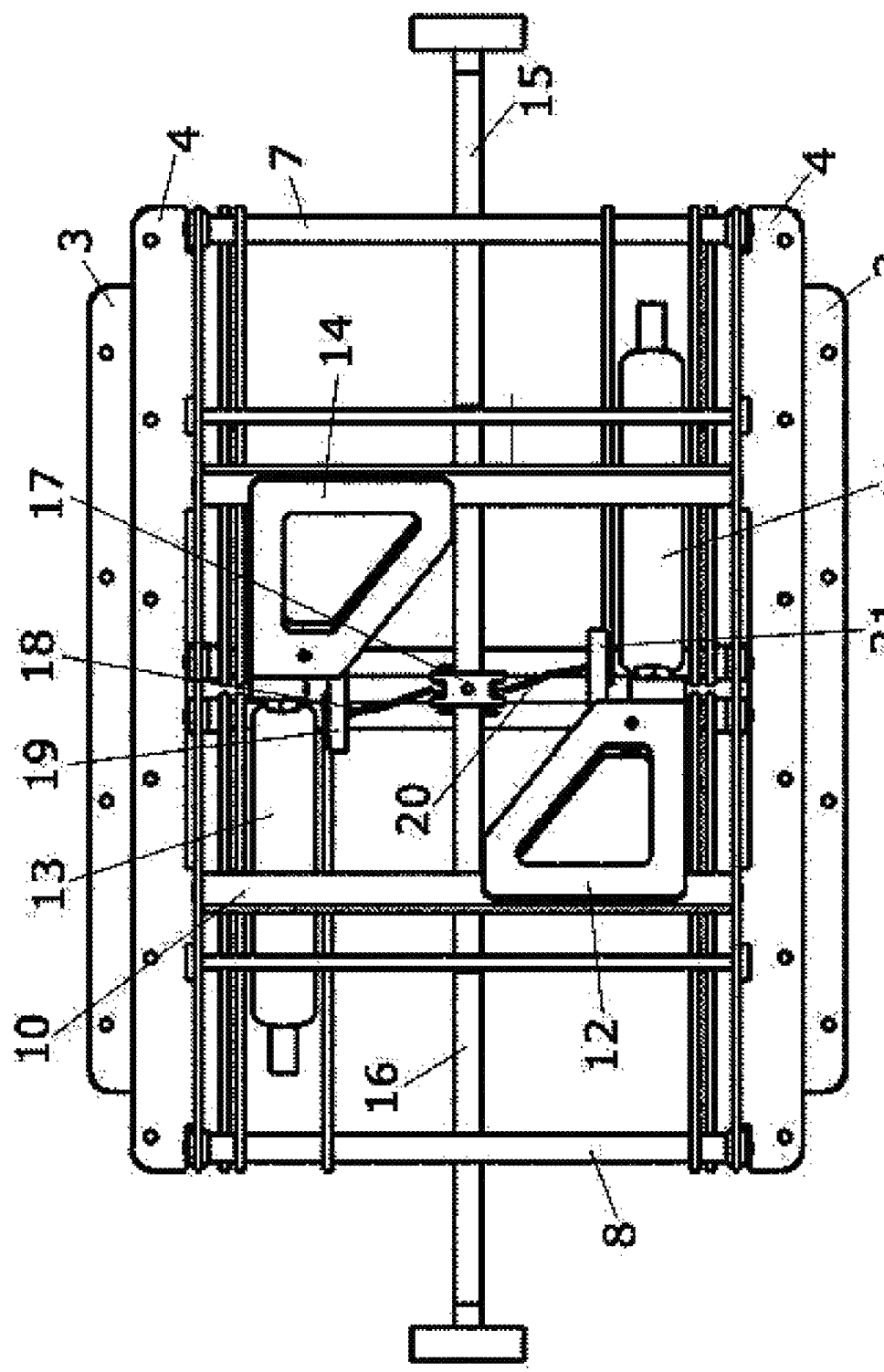
FIG. 3 shows a plan view of the structure for raising and lowering a seat.

FIG. 3 show how the first gas spring (11) is attached at its end to the transverse bars (10) connecting the upper "L"-profiles (4) by means of a connecting part (12), while there is a second gas spring (13) which is attached at its end to the transverse bars (9) connecting to the upper "L"-profiles (4) by means a connecting part (14).

In order to get the gas springs (11) and (13) to actuate, there are a number of actuators, (15) and (16), that protrude from the sides of the seat and which are connected together by means of a central rotation element (17) which has two cables (18) and (20), wherein each of the cables is attached to the central rotation element (17) at one of its ends, while at the other end it is attached to respective angular parts (19) and (21) which by way of a trigger actuate the gas springs (11) and (13).

Rotating either of the two actuators (15) and (16) causes the central rotation element (17) to rotate, which causes the tensioning of the cables and the movement of the angular parts (19) and (21), which by way of a trigger actuate the gas springs (11) and (13), pressing the gas spring valves causes them to actuate and move the seat height. This happens if the user is not seated. If the user were seated when actuating the actuators, the seat is lowered under the weight of the user's body.

The figures show that the seat of the invention is symmetrical relative to a vertical plane passing through the middle, obtaining two mirror-image symmetrical identical halves.

Variations in materials, shape, size and arrangement of the component elements does not alter the essential nature of this invention, described in a non-limiting manner, this being sufficient for its reproduction by an expert.

The invention claimed is:

1. Piano seat with automatic height adjustment comprising:

a first pair of scissor-type mechanisms or articulated structure in the form of an "X" arranged in a facing manner, there being, at its ends, a lower stationary point of articulation, and a lower movable point of articulation at the bottom, whereas the upper ends have an upper stationary point of articulation and an upper movable point of articulation;

a second pair of scissor-type mechanisms or articulated structure in the form of an "X", arranged in a facing manner, there being, at its ends, a first lower stationary point of articulation, and a first lower movable point of articulation at the bottom, whereas the upper ends have a second upper stationary point of articulation and a second upper movable point of articulation, where the lower articulations occur in two "L"-section angular profiles arranged in a facing manner, while upper articulations occur in two upper "L"-section angular profiles arranged in a facing manner, facing articulations, both at the bottom and at the top, stationary and movable and being joined together by connecting bars, wherein above each of the profiles there are individual oblong slots, made in the lower "L"-profiles, whereas with oblong slots made in upper "L" profiles, wherein the upper "L" profiles are further connected together by intermediate transverse bars wherein an assembly is moved by raising or lowering by a first gas spring and a second gas spring, which are actuated by two actuators.

2. Piano seat with automatic height adjustment according to claim 1, wherein the facing articulations, both at the bottom and at the top, stationary and movable being joined together by connecting bars including a first lower connecting bar connecting the lower facing stationary articulations of the scissor-type mechanism, a first upper connecting bar connecting the upper facing stationary articulations of the same scissor-type mechanism, a second lower connecting bar connecting the lower facing stationary articulations of the pair of facing scissor-type mechanisms, and a second upper connecting bar connecting the upper facing stationary articulations of the pair of facing scissor-type mechanisms.

3. Piano seat with automatic height adjustment according to claim 1, wherein the first gas spring is attached at a first actuation end to the transverse bars connecting to the upper "L"-profiles by a connecting part, while the second gas spring which is attached at a second actuation end to the transverse bars connecting to the upper "L"-profiles by means of a connecting part.

4. Piano seat with automatic height adjustment according to claim 1, wherein the actuators protrude from the sides of the seat and which are connected together by a central rotation element which has two cables, wherein each of the cables is attached to the central rotation element at one of its ends, while the other end it is attached to respective angular parts which by way of a trigger actuate the gas springs.

\* \* \* \* \*